(12) United States Patent
Brade

(10) Patent No.: US 7,047,905 B1
(45) Date of Patent: May 23, 2006

(54) ANIMAL STALL SOIL AGITATOR

(75) Inventor: Gene M. Brade, 2250 Geiger Rd., Bad Axe, MI (US) 48413

(73) Assignee: Gene M. Brade, Bad Axe, MI (US)

( * ) Notice: Subject to any disclaimer, the term of this patent is extended or adjusted under 35 U.S.C. 154(b) by 28 days.

(21) Appl. No.: 10/775,927

(22) Filed: Feb. 10, 2004

(51) Int. Cl.
*A01K 31/04* (2006.01)
*A01D 7/02* (2006.01)

(52) U.S. Cl. ............... 119/442; 119/447; 119/451; 172/123; 172/548

(58) Field of Classification Search ............ 172/35, 172/122, 123, 518, 540, 548, 554; 119/442, 119/447, 451
See application file for complete search history.

(56) References Cited

U.S. PATENT DOCUMENTS

| 1,912,706 | A | | 6/1933 | Goodman |
|---|---|---|---|---|
| 2,197,549 | A | | 4/1940 | Hargrave, et al. |
| 2,665,621 | A | | 1/1954 | Smith et al. |
| 2,975,845 | A | | 3/1961 | Simpson |
| 4,287,955 | A | | 9/1981 | Anderson |
| 4,359,831 | A | * | 11/1982 | Beeley ............... 37/258 |
| 4,586,593 | A | * | 5/1986 | Danelson et al. ......... 192/69 |
| 4,892,154 | A | | 1/1990 | Ranner |
| 5,581,914 | A | | 12/1996 | Sinykin |
| 6,056,067 | A | | 5/2000 | Brown |
| 6,257,342 | B1 | | 7/2001 | Szatko |
| 6,467,432 | B1 | | 10/2002 | Lewis et al. |

* cited by examiner

*Primary Examiner*—Christopher J. Novosad
(74) *Attorney, Agent, or Firm*—Reising, Ethington, Barnes, Kisselle & Learman, P.C.

(57) ABSTRACT

The animal stall soil agitator includes a mounting plate assembly pivotally attached to a tractor loader boom for pivotal movement about a transverse horizontal loader boom axis. An elongated frame assembly has an inboard frame end attached to the mounting plate assembly and outboard frame end that extends laterally to one side of the tractor loader boom. An elongated bar is journaled on the elongated frame assembly. A plurality of flat soil agitator bars are fixed to the elongated bar. The flat soil agitator bars are oriented to minimize lateral movement of agitated soil. A reversible hydraulic motor is connected to a hydraulic system of the tractor and rotates the elongated bar in a selected direction. The elongated frame assembly is pivotable about a vertical axis relative to the mounting plate.

11 Claims, 6 Drawing Sheets

ANIMAL STALL SOIL AGITATOR

TECHNICAL FIELD

The soil of a barn stall floor is agitated by a hydraulically driven rotor, with a plurality of rigid tines, journaled on a frame mounted on a tractor mounted loader boom for rotation about a horizontal axis, extending laterally out to one side of the tractor, and wherein the frame is pivotable about the horizontal axis.

BACKGROUND OF THE INVENTION

Cattle are often housed in confinement barns during the cold winter months. They may also be housed in confinement barns during hot summer months. Mild cows produce more milk if they are protected from very cold weather as well as from very hot weather. Cattle that are grown for their meat gain weight faster if they are protected from very cold weather as well as very hot weather. In a confinement facility cattle can also be protected from files and other insects. Cattle in a typical confinement facilities are provided access to water and to a balanced ration. Each animal in the facility has a stall. There is normally a wall at one end of each stall. The stalls are separated by free stall dividers. The dividers are pipes bent into the general shape of a horse shoe. The free ends of each divider pipe are connected to the wall. The open end of the stall is generally identified by curb. An alley extends some distance from the curb to a parallel curb and another row of stalls. The alley has sufficient width to permit each animal to move freely to and from a feeder and a water trough. The alley is a flat concrete slab with a uniform width. In many confinement barns, a scrapper moves the length of the alley periodically and scrapes liquid and solid cattle excrement from the alley and into receivers at the ends of the alley. A tractor mounted scraper can also be used to clean an alley. The alley is preferably cleaned frequently to keep the alley surface as clean and dry as possible.

The stalls have stall floors covered with sand. Cattle lying in a stall tends to create a depression and compact the sand. Liquids collect in the depressions. Compacted sand tends to hold water. Mud and wet sand in the depressions sticks to cattle laying in the depressions creating an uncomfortable condition and possibly an unhealthy environment for cattle.

During the winter, in areas with temperatures well below freezing, the wet sand may freeze. Frozen wet sand is cold, hard, and uncomfortable for cattle. The current procedure for keeping cattle relatively free of wet sand and mud is to add clean sand to fill the depressions in the stalls. The sand that is added is expensive. Excess sand in the stalls tends to migrate over the curb and into the alley. Sand in the alley mixes with the liquid and excrement thereby increasing the quantity of material to be removed from the alley, stored and discarded. From time to time all the sand in the alley must be removed, discarded and replaced by clean and relatively dry sand. The frequent addition of sand to keep stalls relatively dry and clean results in a substantial material handling and disposal tasks that are expensive. It is also difficult to store clean replacement sand in an unfrozen state during winter months in northern areas.

SUMMARY OF THE INVENTION

The animal stall agitator includes a mounting plate assembly adapted to be pivotally connected to a tractor loader boom for pivotal movement about a loader axis that is horizontal and generally transverse to the direction of forward movement of the tractor loader. An elongated frame assembly includes a front horizontal member and a rear horizontal member that is parallel to and spaced from the front horizontal member. Each one of the plurality of spacers is attached to the front horizontal member and to the rear horizontal member. The elongated frame assembly includes an outboard frame end and an inboard frame end. The inboard frame end of the elongated frame assembly is pivotally attached to the mounting plate assembly for pivotal movement about a generally vertical axis between a working position with a frame outboard end at one side of the mounting plate assembly and a transport position with the frame outboard end forward of the mounting plate assembly. A locking assembly interconnects the elongated frame inboard end and the mounting plate assembly to lock the elongated frame assembly in the working position. An elongated bar with a bar outboard end and a bar inboard end is journaled on two of the plurality of spacers of the elongated frame assembly for rotation about a horizontal elongated bar axis. The elongated bar includes a square pipe. A plurality of rigid soil agitator bars are welded to the square pipe in positions spaced apart along the horizontal elongated bar axis and extending radially outward from the horizontal elongated bar axis. At least some of the plurality of rigid soil agitator bars are oriented relative to the horizontal elongated bar axis to minimize displacement of soil. A reversible hydraulic motor is mounted on one of the plurality of spacers of the elongated frame assembly. The reversible hydraulic motor is connected to the bar inboard end of the elongated bar through a coupler assembly to selectively rotate the elongated bar and plurality of soil agitator bars in one direction or another and aerate soil.

The animal stall soil agitator includes a shield attached to the front horizontal member and the rear horizontal member of the elongated frame assembly to catch soil thrown upward by the plurality of rigid soil agitator bars.

BRIEF DESCRIPTION OF THE DRAWINGS

These and other objects, features and advantages will become more readily apparent in view of the following detailed description and best mode, appended claims and accompanying drawings, in which:

DETAILED DESCRIPTION OF THE PREFERRED EMBODIMENTS

Figure 1:
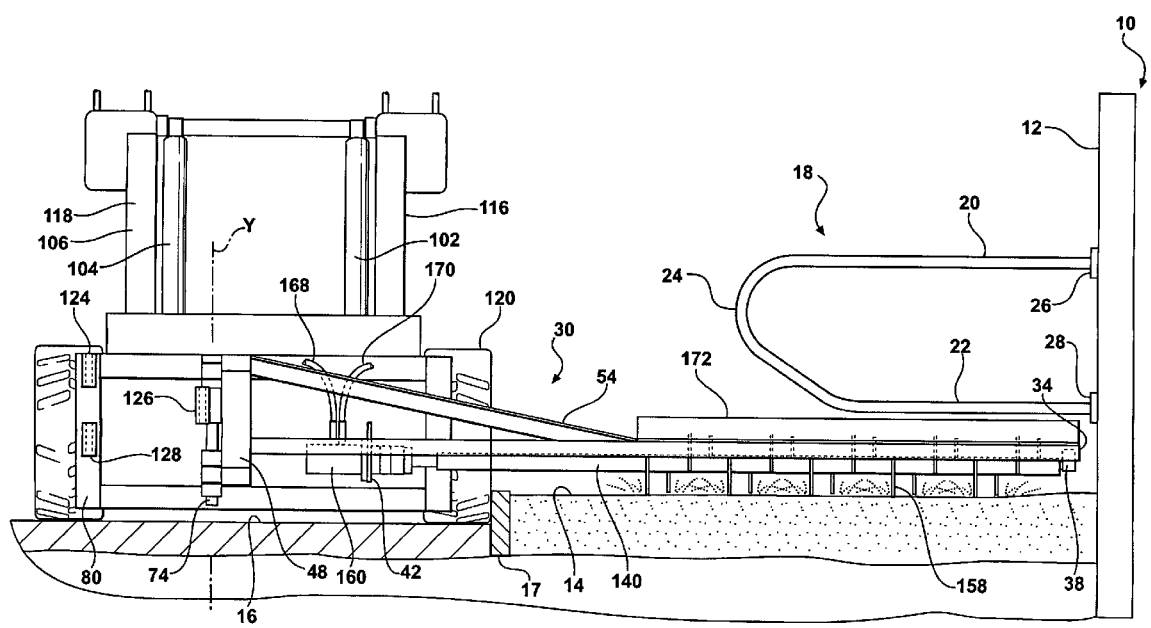
FIG. 1 is a front elevational view of the barn stall floor agitator mounted on a skid steer loader, and in a building for housing livestock.

A livestock barn 10, a portion of which is shown in FIG. 1, includes a wall 12, a floor with a stall area 14, an alley 16 and a curb 17 separating the stall area 14 from the alley 16. The stall area 14 in large livestock barns 10 extend for some distance along the wall 12. Stall dividers 18 divide the stall area 14 into a number of individual stalls each of which is sufficiently large to permit an animal to lie down or to stand. The stall dividers 18 as shown are a generally unshaped tube with an upper horizontal arm 20, a lower horizontal arm 22, and a bight portion 24 connecting the upper and lower arms together. Free ends of the upper arm 20 and the lower arm 22 are anchored to the wall 12 by flanges 26 and 28 and mechanical fasteners (not shown). The lower arm 22 is elevated above the curb 17.

The alley 16 is generally a concrete slab with an upper surface that is generally horizontal. The floor of the stall area 14 is sand. The sand is preferably several inches deep. The sand is normally on top of a dirt subfloor. However, the subfloor could be concrete if desired. The sand maybe mixed with soil and some small rocks. The upper surface of the stall area 14 is preferably above the surface of the alley 16 and near the height of the top of the curb 17. Livestock with hooves can stand and walk on sand without excessive sliding or slipping. They also lay on sand with minimal discomfort. Cattle generally avoid lying on concrete. If they do lie on concrete they may have difficulty rising to their feet.

Figure 6:
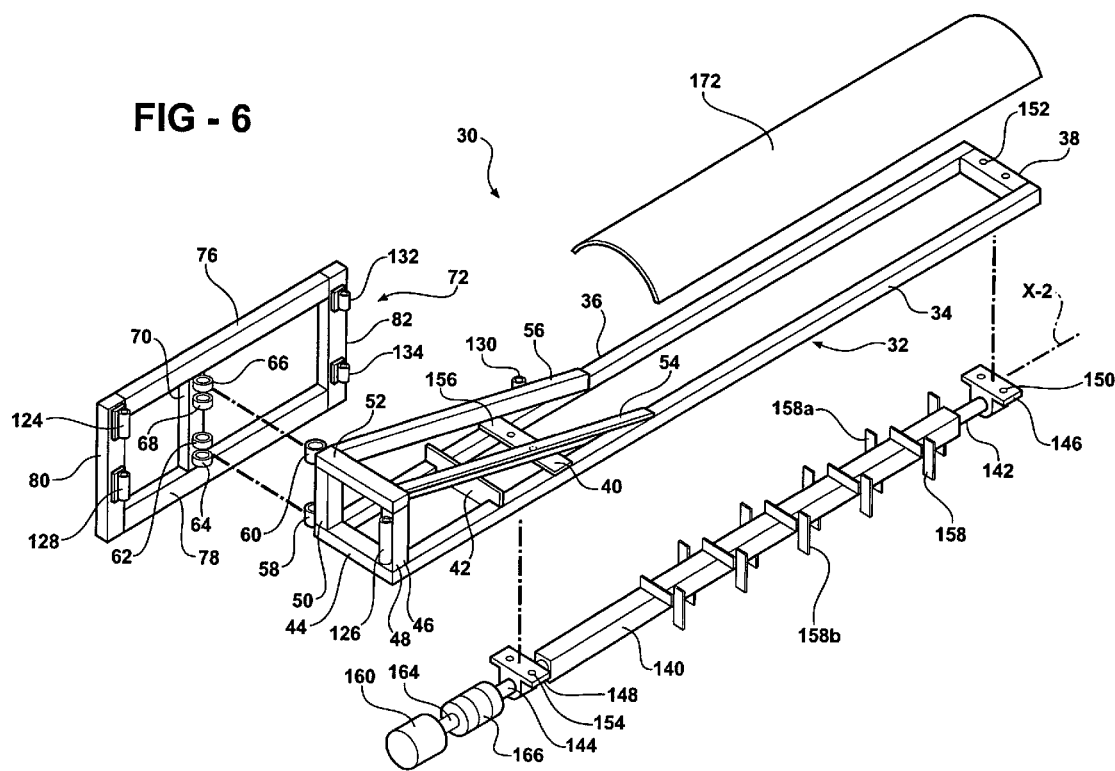
FIG. 6 is an expanded view of the animal stall floor agitator.

The stall floor soil agitator 30 includes an elongated frame assembly 32. The frame 32 includes a front horizontal tube 34 and a rear horizontal tube 36. An outboard end spacer 38 is welded to the outboard ends of the front and rear horizontal beams 34 and 36. A pair of intermediate spacers 40 and 42 are welded to the front and rear horizontal beams 34 and 36. An inboard end spacer tube 44 is welded to the inboard ends of the horizontal tubes 34 and 36. The spacers bars 38, 40, 42 and 44 are frame cross members. A frame mast 46 includes two vertical tubes 48 and 50 and an upper horizontal tube 52 welded to the inboard cross tube 44 and to each other. A front tension member 54 is welded to the upper portion of the mast 46 and to the front horizontal tube 34. A rear tension member 56 is welded to the upper portion of the mast 46 and to the rear horizontal tube 36. The front and rear tension members 54 and 56, as shown in FIG. 6, are angle members. During use the tension members 54 and 56 occasionally become compression members.

A pair of coaxial hinge tubes 58 and 60 are welded to the inboard cross tube 44 and the upper horizontal tube 52 of the mast 46. The lower hinge tube 58 is received between a pair of lower fixed sleeves 62 and 64. The upper hinge tube 60 is received between a pair of upper fixed sleeves 66 and 68. The lower fixed sleeve 62 and 64 and the upper fixed sleeves 66 and 68 are welded to a vertical tube 70 of a mounting plate assembly 72. A pivot pin 74 passes through the upper sleeve 66, the upper hinge tube 60, the upper sleeve 68, the lower sleeve 62, the lower hinge tube 58 and the lower sleeve 64 to pivotally attach the frame assembly 32 to the mounting plate assembly 72 for pivotal movement about a generally vertical axis Y.

Figure 3:
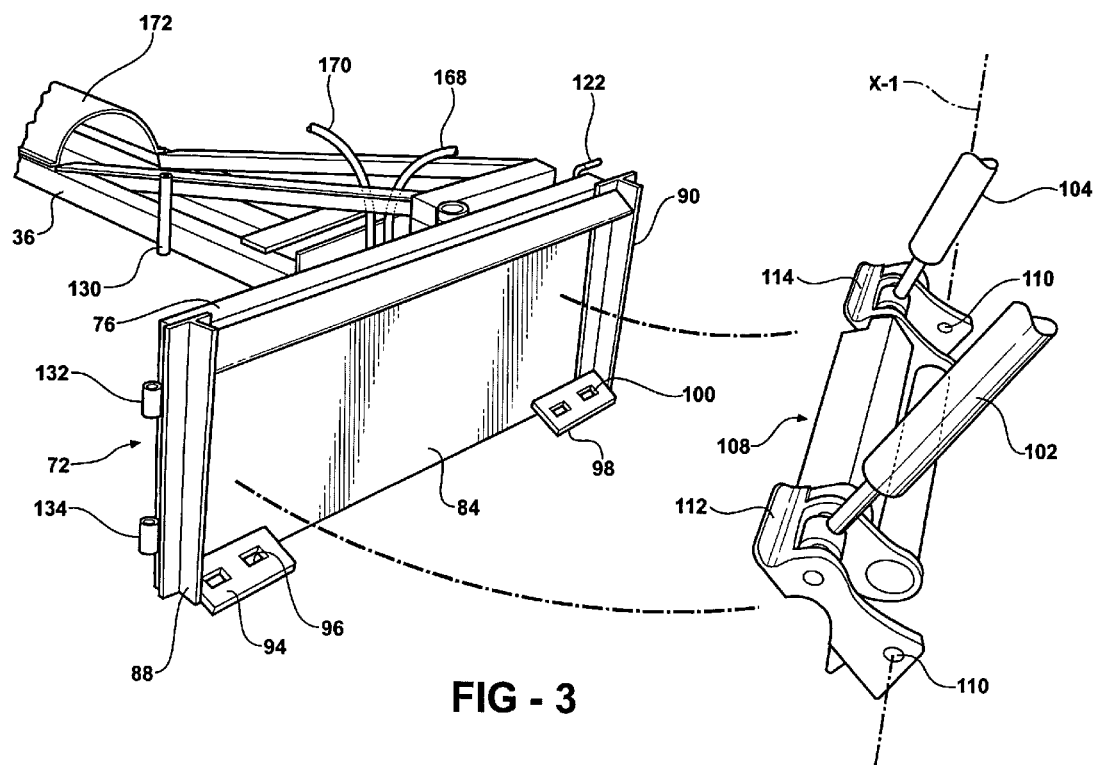
FIG. 3 is a perspective view of the mounting structure for attaching the barn stall floor soil agitator to the loader boom of a tractor mounted loader with parts broken away.

The mounting plate assembly 72 includes an upper horizontal bar 76, a lower horizontal bar 78, a first vertical end bar 80 and a second vertical end bar 80 and a second vertical end bar 82 that are welded together to form a rectangular frame. The bars 76, 78, 80 and 82 are preferably rectangular tubes. The vertical tube 70 is welded to the horizontal bars 76 and 78. A mounting plate 84 is welded to the rear surface 86 of the bars 76, 78, 80, 82 and tube 70. Vertical members 88 and 90 are fixed to ends of the mounting plate 84 as shown in FIGS. 52 and 3. A horizontal bar 92 is fixed to the members 88 and 90 and the mounting plate 84 adjacent to the upper horizontal bar 76 of the mounting plate assembly 72 and extends downwardly and away from the mounting plate to form a pocket that is open from the bottom. A left retainer plate 94 with latch bolt apertures 96 is fixed to the lower end of the member 88. A right retainer plate 98 with latch bolt apertures 100 is fixed to the lower end of the member 90. The mounting plate assembly 72 is attached to the loader boom 106 by extending bucket pivot cylinders 102 and 104. Extending the cylinders 102 and 104 rotates the torques frame assembly 108 counter clockwise about the loader boom axis X-1 of apertures 110, as shown in FIG. 3, and moves the attachment engaging tongues 112 and 114 forward. Pins pass through the apertures 110 to pivotally attaché the torque assembly 108 to the free ends of the left arm 116 and the right arm 118 of the loader boom 106. The tractor 120 is moved forward until the tongues 112 and 114 engage the mounting plate assembly 72. The loader boom 106 is raised, by hydraulic cylinders (not shown), to move the tongues 112 and 114 into the pockets formed by the horizontal bar 92. After tongues 112 and 114 move up between the horizontal bar 92 and the mounting plate 84, the hydraulic cylinders 102 and 104 are retracted, the torque assembly 108 rotates clockwise and the retainer plates 94 and 98 pivot toward engagement with the torque assembly. Lock bolts (not shown), carried by the torque assembly 108 are inserted into the latch bolt apertures 96 and 100 to lock the mounting plate assembly 72 to the torque assembly 108. The torque frame assembly 108 and the mounting plate 84, as described herein, are the structure employed on the skid steer tractor loader 120 of one well known manufacture. However, the mounting plate 84 is attachable to the loaders of several different manufactures. With some modification, the mounting plate 84 can be attached to most tractor loader booms 106 with bucket tilt cylinders. It is also possible to attach the mounting plate of another manufacture to the rear surface 86 of the bars 76, 78, 80 and 82.

Figure 2:
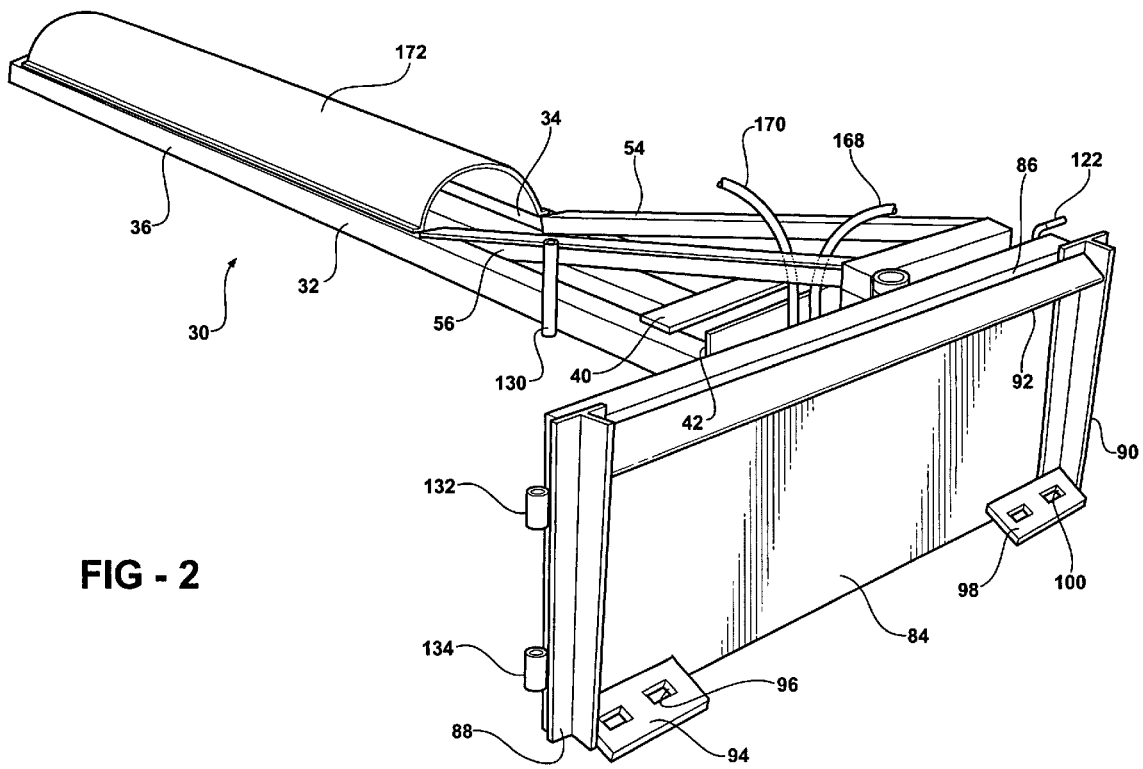
FIG. 2 is a perspective view of the barn stall floor agitator in a transport position.
Figure 5:
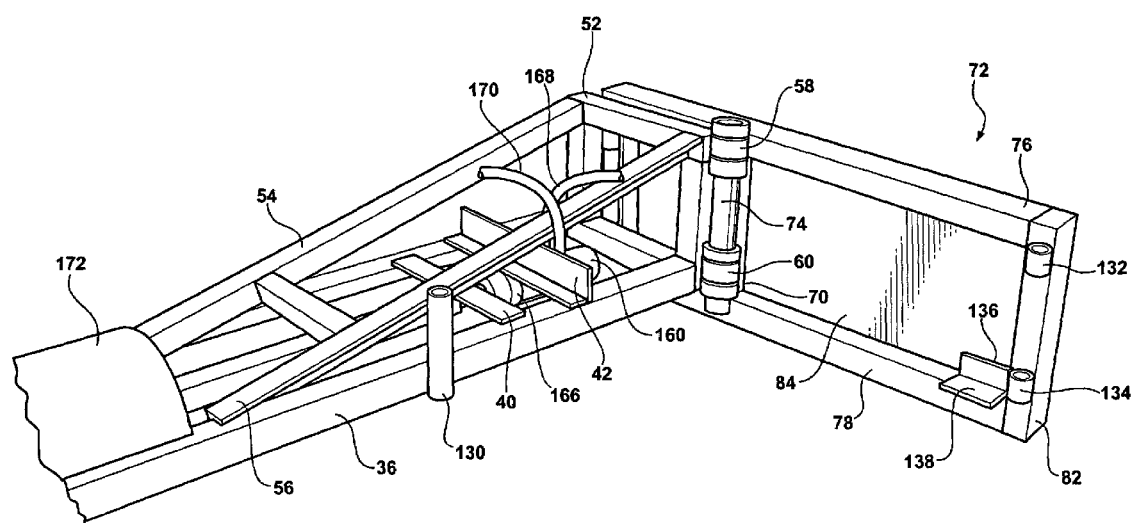
FIG. 5 is a perspective view of the barn stall floor agitator in a transport position with parts broken away.

A locking bar 122 passes through pipes 124, 126, and 128 to hold the elongated frame assembly 32 in a fore and aft transport and storage position as shown in FIGS. 2, 3 and 5. The pipe 126 extends substantially from the pipe 128 to the pipe 124 to form a substantially rigid connection when the locking bar 122 extends through the three pipes and holds the frame assembly 32 in the transport position. The pipes 124 and 128 are welded to the vertical end bar 80 of the mounting plate assembly 72. The pipe 126 is welded to the vertical tube 48 of the frame mast 46.

The locking bar 122 is removed the pipes 124, 126 and 128 to permit pivotal movement of the frame assembly 32 about the pivot pin 74. Pivoting the frame assembly 32 about the pivot pin 74 to move the pipe 130, welded to the frame assembly, between coaxial pipes 132 and 134, welded to the vertical end bar 82 of the mounting plate assembly 72, moves the frame assembly to a transverse working position shown in FIGS. 1 and 4. The locking bar 122 is inserted through the pipe 132, the pipe 130 and the pipe 134 to lock the frame assembly 32 in the transverse working position. The pipe 130 extends substantially from the pipe 132 to the pipe 134 to limit vertical movement of the pipe 130 relative to the mounting plate assembly 72 when the frame assembly 32 is locked in the transverse working position by the locking bar 122. An angle member 136, welded to the mounting plate assembly 72, includes a horizontal portion 138 that engages the bottom of the rear horizontal tube 36, of the elongated frame assembly 32, to limit downward movement of the frame assembly relative to the mounting plate assembly 72.

An elongated bar 140 has a shaft 142 extending from its outboard end and a shaft 144 extending from its inboard end. Both shafts 142 and 144 are fixed relative to the bar 140. The shaft 142 is journaled in a pillow block 146 by a bearing. The shaft 144 is journaled in a pillow block 148 by a bearing. The elongated bar 140 is rotatable about a horizontal elongated bar axis X-2. The pillow block 146 is clamped to the outboard end spacer 38 by bolts that pass through bores 150 in the pillow block 146 and bores 152 through the outboard end spacer. The pillow block 148 is clamped to the intermediate spacer 40 by bolts that pass through bores 154 in the pillow block 148 and bores 156 through the intermediate spacer 40.

The elongated bar 140, as shown in the FIG. 1, is a square tube. The square tube 140 when rotated in contact with soil tends to level the surface of a stall area 14 by moving loose soil from high areas to low areas. The bar 140 could of course be other shapes. A series of axially spaced flat soil agitator bars 158 are welded to the outer walls of the elongated bar 140. Each bar 158 is a rigid rectangular member. The two large area surfaces 158a of each bar 158 are in planes that are transverse to the axis of the elongated bar 140. The edge surfaces 158b intersect the parallel surfaces 158a and are generally transverse to the large area surfaces. The relatively small area edge surfaces 158 b minimize the quantity of soil that is moves by the bars 158. With this orientation, the narrow edge surfaces of each soil agitator bar 158 are in planes that are parallel to the axis of rotation of the elongated bar 140. There is minimal lateral movement of agitated material toward the alley 16 or toward the wall 12. If lateral movement of agitated material is desired, one or more bars 158 could be attached to the elongated bar 140 at an angle. By mounting the agitator bars 158 on the elongated bar 140 as shown, the elongated bar can be rotated in either direction. The length of the agitator bars 158 is relatively short so that the soil agitator 30 can pass under the stall dividers 18.

Agitator bars 158 that are six inches long and welded to a squarer tube 140 that is three inches by three inches, as shown, will pass under most stall dividers. A reversible hydraulic motor 160 is clamped to the intermediate spacer 42 by bolts 162. An output shaft 164 of the hydraulic motor 160 is attached to a shaft coupler assembly 166. The coupler assembly 166 is also attached to the shaft 144 fixed to the inboard end of the elongated bar 140. Any misalignment between the shaft 144 and the out put shaft 164 is accommodated by the coupler assembly 166 thereby protecting the hydraulic motor 160 from forces due to misalignment. Couplers 166 can also dampen torsional vibrations. Hydraulic lines 168 and 170 are connected to the hydraulic motor 160 and to a hydraulic control valve of the hydraulic system of the tractor 120. Tractors 120, manufactured today, generally have a hydraulic system with multiple valves for supplying hydraulic fluid to accessories. The valves can be shifted to reverse the flow of hydraulic fluid to and from the hydraulic motor 160.

Rotation of the elongated bar 140, with the agitator bars 158 and in engagement with the sand floor of the stall area, throws some sand upward. A shield 172 is connected to the upper surfaces of the front horizontal tube 34 and the rear horizontal tube 36 and covers the portion of the rotatable elongated bar 140 with agitator bars 158. The shield 172 deflects sand and rocks, that are thrown upward by the by the agitator bars 158, downward. The shield 172 also keeps animals and people away from the agitator bars 158. The entire elongated frame assembly 32 is a cantilevered to one side of the mounting plate assembly 72. There are no gauge wheels or other supports. The length of the agitator bars 158 is minimized. The short bars 158 in combination with the cantilevered frame 32 permits the shield 172 to pass under substantially all stall dividers 18 currently used in livestock buildings.

Figure 4:
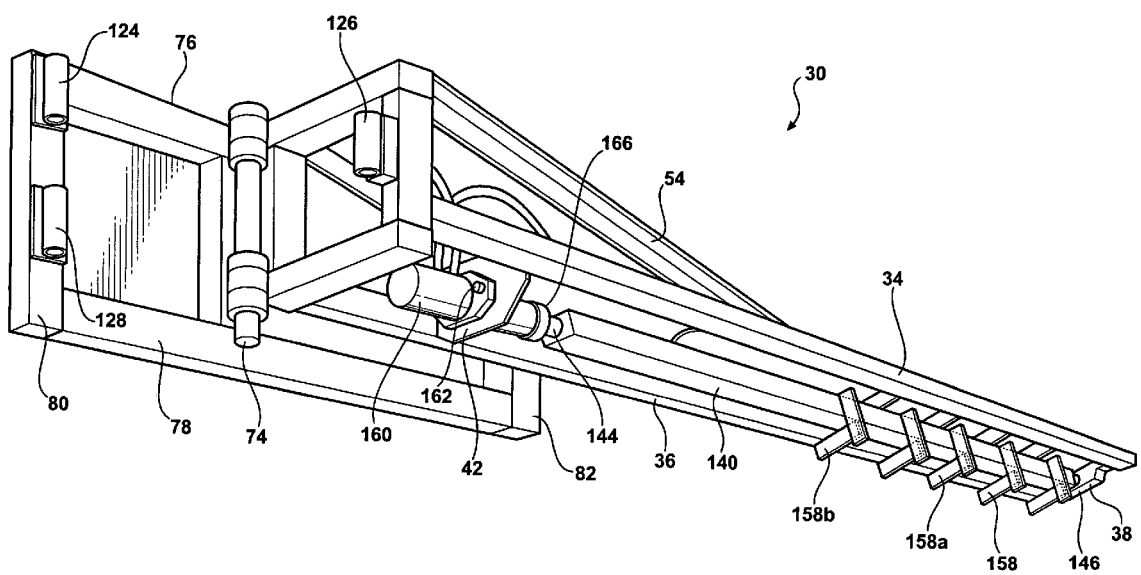
FIG. 4 is perspective view of the barn stall floor agitator in a working position.

During use, the locking bar 122 passes through the pipe 132 on the mounting plate assembly 72, the pipe 130 on the elongated frame assembly 32 and the pipe 134 to hold the frame assembly in a working position shown in FIGS. 1 and 4. The tractor 120 is positioned in the alley 16 adjacent to the curb 17, and ready to move parallel to the curb. The stall floor agitator 30 is lowered to position to the top of the shield 172 at a lower elevation than the lower horizontal arm 22 of the stall divider 18. In this position, the outboard end spacer 38 of the frame 32 is adjacent to the wall 12. The hydraulic cylinders 102 and 104 are extended or retracted to tilt the mounting plate 84 and lower or raise the front horizontal tube 34 relative to the rear horizontal tube 36. The hydraulic lines 168 and 170 then connect the hydraulic motor 160 to a pump and to a sump of the hydraulic system on the tractor 120. Once the hydraulic motor 160 is rotating at an appropriate speed, the tractor traction drive is engaged to move the tractor along the ally 16 and move the rotating bar 140 and the attached flat soil agitator bars 158 along the stall area 14. The tractor 120 can be move in either direction. The hydraulic motor 160 can rotate in either direction. The soil agitator bars 158 brake up and pulverize clumps of frozen sand and moisture if the stall area is frozen. The agitator bars 158 also loosen and aureate the sand. Low areas and areas compacted by the weight of animal are filled in. High areas are lowered. The rotating bar 140 and the attached soil agitator bars 158 will tend to move sand forward when rotating in one direction and to move sand rearward when rotating in the opposite direction. By controlling the direction of rotation of the hydraulic motor 160 and the direction of movement of the tractor 120, sand can, for example, be moved from under the stall dividers and toward the center of each stall if desired. It is usually preferred to generally level the surface of the stall area 14 rather than to provide high areas and low areas. Aeration allows moisture in the sand to evaporate thereby drying the sand. Agitation of the sand also tends to eliminate standing liquids on the floor of stalls thereby keeping cattle relatively clean and dry. Cows that are clean and dry produce more milk and are healthier.

Keeping cows healthy and comfortable is a primary function of the stall floor soil agitator 30. In addition, to providing relatively dry surface for the cows to lie on, the stall floor soil agitator reduces the need to add additional fresh sand to fill depressions and reduce muddy areas. Reducing the quantity of fresh sand required reduces the quantity of contaminated sand to be discarded. Reducing the quantity of fresh sand required as well as the quantity of used sand to be removed from a livestock barn 10 reduces the cost of maintaining livestock thereby reducing the cost of producing milk, cheese and meat.

What is claimed is:

1. An animal stall soil agitator comprising:
    a mounting plate assembly adapted to be pivotally connected to a tractor loader boom for pivotal movement about a loader boom axis that is horizontal and generally transverse to a direction of forward movement of the tractor loader;
    an elongated frame assembly with an inboard frame end attached to the mounting plate assembly and an outboard frame end that extends laterally outwardly to one side of the tractor loader boom;
    an elongated bar, with a bar outboard end and a bar inboard end, journaled on the elongated frame assembly for rotation about a horizontal elongated bar axis, and wherein the elongated bar extends laterally outward to one side of the mounting plate assembly;

a plurality of soil agitator bars secured to the elongated bar and spaced apart along the horizontal elongated bar axis and wherein, the soil agitator bars are rigid members that extend radially outward from the horizontal elongated bar axis and at least some of the soil agitator bars are orientated to minimize displacement of soil;

a reversible hydraulic motor mounted on the elongated frame assembly and connected to the bar inboard end of the elongated bar to selectively rotate the elongated bar and the plurality of soil agitator bars in one direction or another and agitate soil and wherein the inboard frame end of the elongated frame assembly is pivotally attached to the mounting plate assembly for pivotal movement about a generally vertical axis between a working position with the outboard frame end at one side of the mounting plate assembly, and a transport position with the outboard frame end forward of the mounting plate assembly.

2. An animal stall soil agitator, as set forth in claim 1, including a locking assembly for holding the elongated frame assembly in the working position.

3. An animal stall soil agitator, as set forth in claim 1, wherein the elongated bar journaled on the elongated frame assembly includes a square in cross-section pipe.

4. An animal stall soil agitator, as set forth in claim 3, wherein the plurality of soil agitator bars are welded to the square in cross-section pipe.

5. An animal stall soil agitator, as set forth in claim 1, wherein the plurality of soil agitator bars are welded to the elongated bar.

6. An animal stall soil agitator, as set forth in claim 1, wherein the elongated frame assembly includes a front horizontal member, a rear horizontal member that is parallel to and spaced from the front horizontal member, and a plurality of spacers each of which is connected to the front horizontal member and the rear horizontal member.

7. An animal stall soil agitator, as set forth in claim 6, wherein the elongated bar is journaled on two of the plurality of spacers of the elongated frame assembly for rotation about the horizontal elongated bar axis.

8. An animal stall soil agitator, as set forth in claim 7, wherein the horizontal elongated bar axis is parallel to the front horizontal member of the elongated frame assembly.

9. An animal stall soil agitator, as set forth in claim 1, wherein the reversible hydraulic motor is connected to a coupler assembly and the coupler assembly transmits torque to the bar inboard end of the elongated bar.

10. An animal stall soil agitator comprising:

a mounting plate assembly adapted to be pivotally connected to a tractor loader boom for pivotal movement about a loader boom axis that is horizontal and generally transverse to a direction of forward movement of a tractor loader;

an elongated frame assembly including a front horizontal member, a rear horizontal member that is parallel to and spaced from the front horizontal member, a plurality of spacers each of which is connected to the front horizontal member and the rear horizontal member, an outboard frame end and an inboard frame end, and wherein the inboard frame end of the elongated frame assembly is pivotally attached to the mounting plate assembly for pivotal movement about a generally vertical axis between a working position, with the outboard frame end at one side of the mounting plate assembly, and a transport position with the outboard frame end forward of the mounting plate assembly;

a locking assembly interconnecting the inboard frame end of the elongated frame assembly and the mounting plate assembly to lock the elongated frame assembly in the working position;

an elongated bar with a bar outboard end and a bar inboard end journaled on two of the plurality of spacers of the elongated frame assembly for rotation about a horizontal elongated bar axis and wherein the elongated bar includes a square in cross-section pipe;

a plurality of rigid soil agitator bars welded to the square in cross-section pipe, spaced apart along the horizontal elongated bar axis and extending radially outward from the horizontal elongated bar axis and wherein at least some of the plurality rigid soil agitator bars are oriented to minimize displacement of soil; and a reversible hydraulic motor mounted on one of the plurality of spacers of the elongated frame assembly and connected to the bar inboard end of the elongated bar through a coupler assembly to selectively rotate the elongated bar and the plurality of rigid soil agitator bars in one direction or another direction and agitate soil.

11. An animal stall soil agitator, as set forth in claim 10, including a shield attached to the front horizontal member and the rear horizontal member of the elongated frame assembly to catch soil thrown upward by the plurality of rigid soil agitator bars on the elongated bar.

* * * * *